United States Patent [19]
Wood et al.

[11] Patent Number: 5,928,745
[45] Date of Patent: Jul. 27, 1999

[54] THERMOPLASTIC FUEL TANK HAVING REDUCED FUEL VAPOR EMISSIONS

[75] Inventors: Willard E. Wood, Arden Hils; Neil J. Beaverson, Hugo, both of Minn.

[73] Assignee: Cellresin Technologies, LLC, Minneapolis, Minn.

[21] Appl. No.: 08/925,952

[22] Filed: Sep. 16, 1997

Related U.S. Application Data

[63] Continuation of application No. 08/603,749, Feb. 20, 1996, abandoned, which is a continuation-in-part of application No. 08/264,771, Jun. 23, 1994, Pat. No. 5,492,947.

[51] Int. Cl.⁶ .......................... B29D 22/00; B32B 27/08; B32B 27/30; B32B 27/32
[52] U.S. Cl. ................... 428/36.6; 428/35.4; 428/36.7; 428/518; 428/520; 428/522
[58] Field of Search ..................... 428/35.4, 36.6, 428/36.7, 518, 520, 522

[56] References Cited

U.S. PATENT DOCUMENTS

| | | |
|---|---|---|
| 655,661 | 8/1900 | Reenstierna . |
| 2,389,168 | 11/1945 | Snyder ....................... 137/21 |
| 2,412,148 | 12/1946 | Hershberger ................ 154/43.5 |
| 2,715,085 | 8/1955 | Boger ......................... 154/43.5 |
| 2,802,763 | 8/1957 | Freedlander ................ 154/43.5 |
| 2,860,801 | 11/1958 | Nielsen ....................... 215/1 |
| 2,973,293 | 2/1961 | Schofield .................... 146/43.5 |
| 3,129,014 | 4/1964 | Hutchison et al. .......... 280/5 |
| 3,472,835 | 10/1969 | Buckler et al. ............. 260/209 |
| 3,526,572 | 9/1970 | Finelli ........................ 161/183 |
| 3,536,260 | 10/1970 | Volz ........................... 239/6 |
| 3,616,189 | 10/1971 | Harr ........................... 161/190 |
| 3,687,087 | 8/1972 | Yurkoski et al. ........... 105/355 |
| 3,740,258 | 6/1973 | Walles ........................ 117/94 |
| 4,131,141 | 12/1978 | Weissenbach .............. 141/285 |
| 4,258,082 | 3/1981 | Horne ......................... 427/160 |
| 4,274,985 | 6/1981 | Szejtli et al. ............... 260/17.4 |
| 4,303,755 | 12/1981 | Yukuta et al. .............. 521/52 |
| 4,356,115 | 10/1982 | Shibanai et al. ........... 252/522 |
| 4,374,574 | 2/1983 | Shefford ..................... 428/35 |
| 4,434,021 | 2/1984 | Robinson et al. .......... 156/242 |
| 4,547,572 | 10/1985 | Fenyvesi et al. ........... 536/103 |
| 4,598,741 | 7/1986 | Johnson et al. ............ 141/5 |
| 4,636,343 | 1/1987 | Shibanai ..................... 264/118 |
| 4,677,177 | 6/1987 | Shibani et al. ............. 527/300 |
| 4,681,934 | 7/1987 | Shibani et al. ............. 536/46 |
| 4,711,936 | 12/1987 | Shibani et al. ............. 525/485 |
| 4,719,135 | 1/1988 | Gerdes et al. .............. 428/35 |
| 4,722,815 | 2/1988 | Shibanai ..................... 264/117 |
| 4,725,633 | 2/1988 | Shibanai ..................... 523/220 |

(List continued on next page.)

FOREIGN PATENT DOCUMENTS

| | | |
|---|---|---|
| 483380A1 | 5/1992 | European Pat. Off. . |
| 0 626 256 | 11/1994 | European Pat. Off. . |
| 1441752 | 5/1966 | France . |
| 91-6849 | 6/1991 | France . |
| 2677366 | 12/1992 | France . |
| 2927733 | 1/1980 | Germany . |
| 3710569 | 5/1988 | Germany . |
| 75-64144 | 5/1975 | Japan . |
| 84-156531 | 7/1984 | Japan . |
| 84-260004 | 12/1984 | Japan . |
| 61-103542 | 5/1986 | Japan . |
| 86-106348 | 5/1986 | Japan . |
| 87-27162 | 2/1987 | Japan . |
| 87-98608 | 4/1987 | Japan . |
| 87-269030 | 10/1987 | Japan . |
| 62-263047 | 11/1987 | Japan . |
| 88-87925 | 4/1988 | Japan . |
| 63-218063 | 9/1988 | Japan . |
| 63-237932 | 10/1988 | Japan . |
| 63-265926 | 11/1988 | Japan . |
| 89-16618 | 1/1989 | Japan . |

(List continued on next page.)

OTHER PUBLICATIONS

"Formation of ultrathin films consisting of proteins or polysaccharides and syndiotactic–rich poly(vinyl alcohol) mixtures adsorbed at air–solution interface," K. Yamaura et al., *Colloid Polym. Sci.*, 268(10), 968–71. (Abstract).

"Data on Plastic Packaging Materials for Food," H. Sugawara (Akita Prefectural Fermentation Research Institute), *Konbatekku*, Apr. 1994, pp. 1–7. (Translation).

"Synthesis of Chemically Modified Cyclodextrins," Alan P. Croft et al., Tetrahedron Report No. 147, Department of Chemistry, Texas Tech University, Lubbock, TX 79409, U.S.A. (Oct. 4, 1982), pp. 1417–1474.

"Application of cyclodextrin to insecticides, fungicides and aromatic films," I. Shibanai et al., *Gosei Jushi*, 34(4), pp. 2–9. (Abstract).

"Dispersion of β–cyclodextrin inclusion compound in polyethylene and manufacture of its blown films," D. Xu et al., *Gaofenzi Cailiao Kexue Yu Gongcheng*, 7(6), pp. 39–43. (Abstract).

(List continued on next page.)

*Primary Examiner*—Peter A Szekely
*Attorney, Agent, or Firm*—Merchant, Gould, Smith, Edell, Welter & Schmidt, P.A.

[57] ABSTRACT

The invention can comprise a thermoplastic fuel tank or container having a vapor barrier comprising a cyclodextrin composition. A modified cyclodextrin that is chemically modified with substituents that increase the compatibility of the cyclodextrin material in the fuel container material can be used. The improved fuel container obtains substantial barrier properties from the interaction between the cyclodextrin material in the fuel container materials with the fuel vapor permeant materials. The cyclodextrin in the fuel tank walls complexes or entraps fuel vapor that permeates through the materials making up the tank and are held within the tank material preventing the permeant fuel vapor from passing through the tank into the environment. The fuel vapor permeant can comprise a variety of well known materials including aliphatic and aromatic hydrocarbons, oxygenates such as tertiary butyl methyl ether, ethanol, methanol, and other combustible liquid fuel materials.

27 Claims, 1 Drawing Sheet

U.S. PATENT DOCUMENTS

| | | | |
|---|---|---|---|
| 4,725,657 | 2/1988 | Shibanai | 523/210 |
| 4,726,905 | 2/1988 | Friedman et al. | 210/692 |
| 4,727,064 | 2/1988 | Pitha | 514/58 |
| 4,728,510 | 3/1988 | Shibanai et al. | 424/94.5 |
| 4,732,759 | 3/1988 | Shibanai et al. | 424/94.61 |
| 4,738,923 | 4/1988 | Ammeraal | 435/97 |
| 4,769,242 | 9/1988 | Shibanai | 424/411 |
| 4,772,291 | 9/1988 | Shibanai et al. | 8/526 |
| 4,774,329 | 9/1988 | Friedman | 536/103 |
| 4,781,977 | 11/1988 | Yagi et al. | 428/332 |
| 4,808,232 | 2/1989 | Beesley | 127/46.3 |
| 4,840,679 | 6/1989 | Ammeraal et al. | 127/40 |
| 4,847,151 | 7/1989 | Shibanai | 428/389 |
| 4,851,394 | 7/1989 | Kubodera | 514/54 |
| 4,871,541 | 10/1989 | Shibanai | 424/411 |
| 4,902,788 | 2/1990 | Zemel et al. | 536/1.1 |
| 4,904,306 | 2/1990 | Ammeraal | 127/46.1 |
| 4,904,307 | 2/1990 | Ammeraal | 127/63 |
| 4,906,488 | 3/1990 | Pera | 426/573 |
| 4,917,956 | 4/1990 | Rohrbach | 428/423.1 |
| 4,920,214 | 4/1990 | Friedman | 536/103 |
| 4,938,998 | 7/1990 | Stock | 427/223 |
| 4,965,104 | 10/1990 | Barton et al. | 428/34.1 |
| 4,977,936 | 12/1990 | Thompson et al. | 141/312 |
| 5,001,176 | 3/1991 | Nakazima | 524/48 |
| 5,006,377 | 4/1991 | Delcorps et al. | 428/34.7 |
| 5,007,966 | 4/1991 | Hedges et al. | 127/34 |
| 5,007,967 | 4/1991 | Ammeraal | 127/46.1 |
| 5,032,182 | 7/1991 | Ammeraal et al. | 127/63 |
| 5,063,251 | 11/1991 | Bergishagen | 521/84.1 |
| 5,098,793 | 3/1992 | Rohrbach et al. | 428/532 |
| 5,100,878 | 3/1992 | Geber | 514/58 |
| 5,102,699 | 4/1992 | Beeson et al. | 427/379 |
| 5,129,544 | 7/1992 | Jacobson et al. | 220/562 |
| 5,139,687 | 8/1992 | Brogher et al. | 252/8.6 |
| 5,142,035 | 8/1992 | Lewis | 536/103 |
| 5,177,129 | 1/1993 | Bobo, Jr. | 524/48 |
| 5,178,946 | 1/1993 | Sato et al. | 428/412 |
| 5,180,190 | 1/1993 | Kersey et al. | 280/838 |
| 5,183,809 | 2/1993 | Weisz et al. | 514/58 |
| 5,198,429 | 3/1993 | Konig et al. | 514/58 |
| 5,202,188 | 4/1993 | Bekele | 428/414 |
| 5,208,083 | 5/1993 | Freed | 428/36.7 |
| 5,208,316 | 5/1993 | Yoshiaga | 528/68 |
| 5,213,808 | 5/1993 | Bar-Shalom et al. | 424/473 |
| 5,223,311 | 6/1993 | Tsutsumi et al. | 427/388.1 |
| 5,223,346 | 6/1993 | Lu | 428/516 |
| 5,230,935 | 7/1993 | Delimoy et al. | 428/36.7 |
| 5,232,767 | 8/1993 | Hisazumi et al. | 428/213 |
| 5,241,059 | 8/1993 | Yoshinaga | 536/4.1 |
| 5,244,615 | 9/1993 | Hobbs | 264/83 |
| 5,246,611 | 9/1993 | Trinh | 252/8.6 |
| 5,247,013 | 9/1993 | Shinoda et al. | 525/54.2 |
| 5,252,384 | 10/1993 | Bothe et al. | 428/212 |
| 5,254,394 | 10/1993 | Bothe et al. | 428/212 |
| 5,256,491 | 10/1993 | Ishida et al. | 28/500 |
| 5,258,414 | 11/1993 | Bergishagen | 521/84.1 |
| 5,262,444 | 11/1993 | Rusincovitch et al. | 521/50.5 |
| 5,266,387 | 11/1993 | Fujii et al. | 428/213 |
| 5,266,413 | 11/1993 | Mills et al. | 428/480 |
| 5,269,935 | 12/1993 | Clough et al. | 210/653 |
| 5,314,733 | 5/1994 | Saito et al. | 428/36.6 |
| 5,352,717 | 10/1994 | Bergishagen | 524/48 |
| 5,378,414 | 1/1995 | Derkach | 264/22 |
| 5,378,421 | 1/1995 | Salame | 264/230 |
| 5,384,172 | 1/1995 | Takado et al. | 428/35.7 |
| 5,398,729 | 3/1995 | Spurgat | 138/133 |
| 5,472,613 | 12/1995 | Schofield | 210/634 |

FOREIGN PATENT DOCUMENTS

| | | |
|---|---|---|
| 89-167496 | 6/1989 | Japan . |
| 90-18702 | 1/1990 | Japan . |
| 90-18703 | 1/1990 | Japan . |
| 90-18704 | 1/1990 | Japan . |
| 90-18705 | 1/1990 | Japan . |
| 90-18706 | 1/1990 | Japan . |
| 90-25844 | 9/1990 | Japan . |
| 3-100065 | 4/1991 | Japan . |
| 91-133163 | 6/1991 | Japan . |
| 4-108523 | 4/1992 | Japan . |
| 6-181728 | 7/1994 | Japan . |
| 7-35168 | 4/1995 | Japan . |
| 91-JP667 | 5/1991 | WIPO . |
| 0014888 | 7/1991 | WIPO . |
| 91-JP1012 | 7/1991 | WIPO . |
| 95 12484 | 5/1995 | WIPO . |
| 96 00260 | 1/1996 | WIPO . |

OTHER PUBLICATIONS

"β–Cyclodextrin Matrix Films for Colon–Specific Drug Delivery," v. Siefke et al., *Proceed. Intern. Symp. Control. Rel. Bioact. Mater.*, 20 (1993), Controlled Release Society, Inc., pp. 182–184.

"Use of CDS in Plastics & Paper," *Cyclodextrin News*, vol. 3, No. 7 (Mar. 1989).

"Practical Application of Cyclodextrine to the Production of Insecticide, Mold Control and Fragrant Plastic Films," I. Shibanai et al., Japan Liquid Crystal. Co., Ltd.

"Polymer Inclusion Compounds by Polymerization of Monomers in β–Cyclodextrin Matrix in DMF Solution," M. Maciejewski et al., *J. Macromol. Sci.–Chem.*, A13(1), pp. 87–109 (1979).

"The thin film of fluroine–containing polymer having cyclodextrin prepared by Langmuir–Blodgett technique," M. Tamura et al., *Chem. Lett.*, (7), 1313–16. (Abstract).

"Surface–active properties of β–lactoglobulin: adsorption and rearrangement of glycosylated derivatives in surface films," Ralph D. Waniska et al., *J. Colloid Interface Sci.*, 117(1), pp. 251–257. (Abstract).

"Preparation and properties of insoluble films of cyclodextrin condensation polymers," W. Kutner et al., *J. Inclusion Phenom. Mol. Recognit. Chem.*, 13(3), pp. 257–265.

"Basic Concepts of Permeation Processes," *Recent Developments in Separation Science*, pp. 107–155.

"Permeability Coefficients," H. Yasuda et al., pp. 229–240.

"Permeation, Diffusion, and Sorption of Gases and Vapors," R. M. Felder et al., *Methods of Experimental Physics*, vol. 16c, Copyright 1980 by Academic Press, Inc.

"Chapter 1 The Simple Transport Laws," *Diffusion and Sorption Fibers and Films*, pp. 3–11.

"Chapter 14 Convective Diffusion to a Solid Surface," *Diffusion and Sorption in Fibers and Films*, pp. 172–192.

"Fundamentals of gas permeation," D. L. MacLean et al., *Hydrocarbon Processing*, Aug. 1983.

Barrier Polymers, Kirk–Othmer, Encyclopedia of Chemical Technology, Fourth Edition, vol. 3, pp. 931–962.

Chinodex® Cyclodextrins, Chinoin Pharmaceutical and Chemical Works Ltd. pp. 1–40.

"Solubility of Gases in Polyethylene," A. S. Michaels et al., *Journal of Polymer Science*, vol. L, pp. 393–412 (1961).

"Sorption and Flow of Gases in Polyethylene," A. S. Michaels et al., *Journal of Polymer Science*, vol. XLI, pp. 53–71 (1959).

"Analysis of Transient Sorption and Permeation of Small Molecules in Multiphase Polymer Systems," J. M. Ottino et al., *Polymer Engineering and Sciences,* vol. 24, No. 2, pp. 153–161 (1984).

"Mechanical Properties and Permeability of Polypropylene and Poly(ethylene terephthalate) Mixtures," P. Bataille et al., *Polymer Engineering and Science,* vol. 27, No. 9 (1987).

"Permeation of Pure Gases under Pressure through Asymmetric Porous Membranes. Membrane Characterization and Prediction of Performance," R. Rangarajan et al., *Ind. Eng. Chem. Process Des. Dev.,* vol. 23, No. 1 (1984), pp. 79–87.

"Integrated Forms of Simple Rate Expressions," pp. 17–19. *Polymer Handbook,* J. Brandrup et al. Interscience Publishers.

"Trends in Barrier Design," *Packaging,* May 1991, pp. 30–38.

"Barrier Packaging Technologies—What are the Alternatives?", Ronald H. Foster, Session 5 Design for Plastics Packaging.

"Minimizing Plastic Package/Product Interactions—An Unfilled Need," John D. Culter, *Journal of Plastic Film & Sheeting,* vol. 8, Jul. 1992, pp. 208–226.

"Interaction Between Packaging Materials and Foods," Chaim H. Mannheim et al., *Packaging Technology and Science,* vol. 3, pp. 127–132 (1990).

"Packaging for Flavour Retention and Protection from Odours," W. Guise, *Packaging,* Aug. 1992, pp. 9–13.

"The Odour Barrier Performance of Packaging Films," M.G.R. Zobel, *Packaging,* Dec. 1986, pp. 22–25.

"Barrier Media," J. Rellmann et al., *Kunststoffe German Plastics,* 82 (1992), pp. 3–9.

"Recycled Polymers in Food Packaging: Migration Considerations," Timothy H. Begley et al., *Food Technology,* Nov. 1993, pp. 109–112.

"Migration of plasticizers from printing inks into foods," Laurence Castle et al., *Food Additives and Contaminants,* vol. 6, No. 4 (1989).

"Method for Evaluating Package–Related Flavors," Lisa J. Thompson et al., *Food Technology,* Jan. 1994, pp. 90–94.

"Off–flavours' in foods, a summary of experience: 1948–74," N. Goldenberg et al., *Chemistry and Industry,* Jul. 5, 1975, pp. 551–557.

"Organoleptic and Migrational Properties of PP Films Produced with Various Amounts of Scrap," F. Lox et al., *Packaging Technology and Science,* vol. 5, pp. 307–312 (1992).

"Nylon Film in Food Packaging," *Paper, Film & Foil Converter,* p. 62.

"Optimizing the Value and Benefits of Packaging Films," R. Marsili, *Food Product Design,* Nov. 1993, pp. 63–75.

"Materials," *Modern Plastics International,* Jul. 1992, p. 50.

"Chapter 1 An Overview of Food and Food Packaging Interactions," Joseph H. Hotchkiss, *American Chemical Society,* 1988, pp. 1–10.

"Chapter 2 Transport of Apple Aromas in Polymer Films," P. T. DeLassus et al., *American Chemical Society,* 1988, pp. 11–27.

"Chapter 4 Permeation of High–Barrier Films by Ethyl Esters," J. Landois–Garza et al., *American Chemical Society,* 1988.

"Cyclodextrin Inclusion Compounds in Research and Industry," Wolfram Saenger, *Angew. Chem. Int. Ed. Engl.,* 19, pp. 344–362, 1980.

"Dow Eyes An Entry Into Fuel Tank Resin Supply", Apr. 1998, p. 12.

"Steel vs. Plastics: The Competition for Light–Vehicle Fuel Tanks", Peter J. Alvarado, *JOM,* 48 (7) (1996), pp. 22–25.

"Permeation of gasoline–alcohol fuel blends through high––density polyethylene fuel tanks with different barier technologies", Daniel J. Kathios et al., Source: SAE Technical Paper Series. Publ by SAE, Warrendale, PA, pp. 1–14. Abstract Only.

"Gasoline vapours barrier process for plastic tanks and testing methods", A. Addeo et al., Source: Proceedings—Society of Automotive Engineers, Publ by SAE, Warrendale, PA, pp. 507–516. Abstract Only.

"Laminar Barrier Technology for Blow Molding Plastic Fuel Tanks", Richard L. Bell, Source: Publ by Soc of Plastics Engineers, Brookfield Cent, CT, pp. 95–97. Abstract Only.

"Direct In–Line Fluroination of HDPE Fuel Tanks", K. J. .Kallish, Source: Annual Technical Conference—Society of Plastics Engineers 43rd. Publ by Soc of Plastics Engineers, ANTEC '85, Washington, DC, Abstract Only.

"Worldwide Status of HDPE Fuel Tanks", D.L. Peters, Source: Publ by Soc of Plastics Engineers, Brookfield Center, CT, pp. 403–420. Abstract Only.

"Development of plastic fuel tank using modified multi––layer blow molding", K. Fukuhara et al., Source: SAE Technical Paper Series. Publ by SAE, Warrendale, PA. Abstract Only.

"Vehicle Emissions Laboratory" article.

PEC, "Joint R&D Projects at the Advanced Technology and Research Institute" article.

Environmental Test Center—Chrysler, Auburn Hills, Michigan Data Sheet.

Mitsubishi Motors Australia Ltd. Vehicle Emissions Laboratory Data Sheet.

Environment Protection Authority of Victoria Data Sheet.

SHED—Sealed Housing for Evaporative Determination article.

Clean Air Act Amendments—Control of Evaporative Emissions article.

"Dynamic mechanical measurement yields a better HDPE fuel tank.", Charles L. Rohn, Source: Modern Plastics v 66 n 10 Oct. 1989, pp. 129, 131–132. Abstract Only.

"Six layers are impervious", K. Esser, K. et al., Source: Kunststoffe Plast Europe v. 86 n 8 Aug. 1966, pp. 9–11. Abstract Only.

Dimensions of cyclodextrins

THERMOPLASTIC FUEL TANK HAVING REDUCED FUEL VAPOR EMISSIONS

This is a Continuation of application Ser. No. 08/603,749, filed Feb. 20, 1996, now abandoned, which application is a continuation-in-part of Ser. No. 08/264,771, filed Jun. 23, 1994, now U.S. Pat. No. 5,492,947, which application(s) are incorporated herein by reference.

FIELD OF THE INVENTION

The invention relates to an improved fuel reservoir, container or tank for a motorized vehicle containing a barrier to the passage of fuel vapor by permeation or diffusion from the interior of the container into the environment. The fuel vapor can comprise a vapor derived from an aromatic, aliphatic, olefinic, etc. hydrocarbon liquid, fuel oxygenates, alcohol, etc. The fuel container for motor vehicles can be manufactured, in whole or in part, from thermoplastic materials such as polyethylene, polypropylene, polyester, and other useful thermoplastic materials. Such materials can be made of a single layer or component or can be made from layered or laminated materials comprising a thermoplastic material, a metallic component and synthetic fibers, thermoset materials, etc. The fuel tanks of the invention incorporate a barrier component or barrier structure to reduce the tendency of fuel vapor to permeate through the fuel container into the atmosphere. The thermoplastic fuel tank can be manufactured using a variety of known techniques.

BACKGROUND OF THE INVENTION

Fuel tanks for motorized vehicles have been in use for many years. In large part, the typical fuel tank currently in use is a generally box-like, cylindrical or rectangular shape and can contain from about 40 to 100 liters or more of a liquid fuel. Fuels can include diesel fuel, gasoline, gasohol, etc. Commonly, a fuel tank can be manufactured by welding, typically metallic half-shell portions to form a sealed tank system. Other metal forming and sealing systems are known. A fuel neck or filler tube is often installed in the tank with a variety of sealing mechanisms. Such a fuel filler tube can be also closed with vapor safe closure or valve mechanisms to prevent the escape of fuel vapor during fueling and use. The current fuel tanks installed in motorized vehicles are typically metallic in nature and are typically quite impermeable to the passage of fuel vapor. Typically, vapor can be lost through joints between metal sections, from an instrument sensor port, from the fuel line leading to the engine, or from the fuel neck during fueling of the vehicle. Examples of fuel containment systems used during fueling are shown in Weissenbach, U.S. Pat. No. 4,131,141; Thompson et al., U.S. Pat. No. 4,977,936; and Johnson et al., U.S. Pat. No. 4,598,741.

Recently, a great deal of attention has been given to improvements in fuel tank design. A large number of patents have been directed to the manufacture of fuel tanks from thermoplastic, composite or thermosetting materials using a variety of laminate or composite structures. Such structures can include layers derived from thermoplastic materials, thermosetting materials, natural and synthetic fibers, metallic fibers, metallic layers, coating layers derived from aqueous and solvent born compositions, etc. One problem arising from the use of such materials in a fuel container relates to the increased permeability of fuel vapor through the organic polymeric container materials when compared to metal tanks. A fuel tank comprising a large proportion of a thermoplastic resin such as polyethylene or polypropylene as a major structural component can have a substantial fuel permeability. Such tanks can release significant proportions of fumes or vapor typically comprising an aromatic, an aliphatic, an oxygenate, an alcohol, etc. or mixtures thereof. Other thermoplastic or thermosetting materials, depending on their chemical constituents, can also release some proportion of the aromatic compound content of fuels, oxygenated materials such as methyl tertiary butyl ether, ethanol, methanol, etc.

Any successful fuel tank using improved technologies must have improved barrier properties to the passage of fuel vapor through the tank. One technique used to improve the barrier properties of fuel tanks involves the formation of a multilayer structure having one or more layers with improved barrier properties. Harr, U.S. Pat. No. 3,616,189 teaches an improved container having multiple layers including a nylon barrier film. Beeson et al., U.S. Pat. No. 5,102,699 teach a film laminate using polyvinyl alcohol as a solvent barrier layer. Delimony et al., U.S. Pat. No. 5,230,935 teach a multilayer material using a variety of compositions to improve the barrier properties of the material. Spurgat, U.S. Pat. No. 5,398,729 teaches a fuel hose having barrier properties derived from layers of impermeable tape, metallic layers which are helically wrapped around a tubular rubber extrusion. These structures have had some success in improving barrier properties. However, the manufacturer of multilayered or laminate materials often involves complex, expensive processing steps and expensive materials.

Specific chemical barrier additive materials have been added to fuel tankage structures to improve barrier properties. Walles, U.S. Pat. No. 3,740,258 and Shefford, U.S. Pat. No. 4,371,574 teach that the addition of sulphonic acid or sulphonate groups on the surface of tank materials can improve barrier properties. These groups are formed by sulfonating the polymer surface with gaseous sulfonation reagents. Gerdes et al., U.S. Pat. No. 4,719,135 teach improving barrier properties of fuel tanks using a varnish coating comprising an epoxy resin, an amine, a curing agent, and a flexibilizer or plasticizer material. Stock, U.S. Pat. No. 4,938,998 teaches that a phosphate, sulfate, carbonate or amino functionalized cellulose derivative as a surface coating, on a polypropylene or polyethylene tank, can improve barrier properties to the passage of fuel vapor. Barton et al., U.S. Pat. No. 4,965,104 teach that closed thermoplastic containers based on copolymers of carbon monoxide or sulfur dioxide can have improved barrier properties. Delcorps et al., U.S. Pat. No. 5,006,377 teach that improved barrier membranes containing a chlorine containing polymer and an adhesive layer consisting of a copolyamide, having a specific degree of crystallization, when combined with a fluorine containing polymer can form improved barrier layers. Hobbs, U.S. Pat. No. 5,244,615 teaches that improved barrier properties to the passage of hydrocarbon fuel vapor can be improved using a fluorinated polymer. In Hobbs, during blow molding of a fuel container, a measured amount of fluorine gas is introduced into the blowing gas. During molding operations, fluorine gas reacts with the polymer composition at the elevated molding temperature to effectively fluorinate the surface resulting in an improved barrier layer. Saito et al., U.S. Pat. No. 5,314,733 teach a multilayer fuel container structure. The multilayer composite comprises a first structural layer, an adhesive layer and a third structural layer.

While many of these systems that involve the use of chemical agents to improve barrier properties have utility in barrier systems, many of these systems involve corrosive chemical systems, complex laminate structures, and other aspects that would require significant investment in developing effective manufacturing methods. Significant need for improvement in fuel vapor barrier systems is present in this fuel tank technology.

BRIEF DESCRIPTION OF THE INVENTION

The invention resides in an improved fuel tank having substantial barrier properties to the passage of fuel vapor from the interior of the tank, through the tank structure, into the environment. The fuel vapor barrier properties of the fuel tank arise from at least one layer comprising a thermoplastic material having dispersed in the thermoplastic material a cyclodextrin (CD) barrier additive material substantially free of an inclusion compound. The cyclodextrin material can be made more compatible with thermoplastic by introducing at least one substituent on a primary or secondary hydroxyl (—OH) of the cyclodextrin. A substituent is selected to improve the compatibility between the modified cyclodextrin and the thermoplastic material. An effective amount of the modified cyclodextrin is introduced into the thermoplastic such that fuel molecules passing through the thermoplastic layer are entrapped in the internal pore of the cyclodextrin material and are complexed and held as a guest molecule by the cyclodextrin. The compatible cyclodextrin or modified cyclodextrin material is a compound substantially free of an inclusion complex. For the purposes of this invention, the term "substantially free of an inclusion complex", means that the quantity of the dispersed cyclodextrin in the fuel tank structure contains a large effective barrier fraction of cyclodextrin having rings free of a fuel permeant molecule in the interior of the cyclodextrin molecule or other inclusion complex molecule. Some cyclodextrin inherently becomes filled with a guest molecule. The cyclodextrin can be added to the thermoplastic material without complexed material. However, some complexing of the cyclodextrin can occur during manufacture from polymer degradation or from inks, coating components or other materials used in conjunction with the thermoplastic material. The barrier properties arise from having a substantial fraction (greater than 50 mole % up to 100.0 mole %) of the cyclodextrin molecules with an internal cavity unoccupied by any fuel permeant or other component.

The fuel tank of the invention can be a single structural layer or shell of a thermoplastic having evenly distributed in the thermoplastic a cyclodextrin barrier additive material. Further, the tank can be a laminated or multilayer fuel tank comprising a structural layer and a barrier layer. The cyclodextrin can be in the structural layer, in any or all laminate layers or in a single layer or intermediate film layer in a multilayer structure. Further, the fuel tank can be prepared by joining half tank sections at a joining edge and sealing the tank using thermal welding, hot melt adhesives, thermosetting (e.g., epoxy or urethane) adhesives, flange clamps or other known sealing technology. In such a tank, the barrier material can be an additive in the structural polymer, an external coating, an interior bladder or balloon layer, an interior coating or a blow molded interior layer.

The tanks can be manufactured with a port for a fuel pump or a fuel line, an instrument port opening, a filler tube ports and mounting flanges or other mounting means. The tanks can be made in virtually any shape or configuration and can have a surface relief that provides added strength to the tank structure. Lastly, the tank can hold virtually any volume of liquid fuel from 500 milliliters to 250 liters or more depending on vehicle and engine size. Preferably, fuel reservoirs for passenger vehicles can range from about 30 liters to 100 liters or more. Fuel reservoirs for larger vehicles such as trucks, delivery vehicles, buses, electric locomotives, etc. can range from 120 liters to 300 liters or more. In aviation applications the fuel reservoirs can contain from about 100 to 20,000 kg, or more, of fuel.

BRIEF DISCUSSION OF THE DRAWINGS

FIG. 1 is a graphical representation of the dimensions of the cyclodextrin molecule without derivatization. An α-, β- and γ-cyclodextrin is shown.

DETAILED DESCRIPTION OF THE INVENTION

The cyclodextrin barrier material can be introduced into bulk polymer used in manufacturing the fuel tank or can be incorporated into a barrier film or layer used in the production of a multilayer or laminate tank.

Barrier Wall or Film

The thermoplastic material and cyclodextrin can be formed into the fuel tank wall, in an internal or external coating or internal balloon or bladder. A wall, film or a sheet is a flat unsupported section of a thermoplastic resin whose thickness is much smaller than its width or length. Films are generally regarded as being 0.25 millimeters (mm) or less, typically 0.01 to 20 mm thick. Sheet may range from about 0.25 mm to several centimeters (cm), typically 0.3 to 3 mm in thickness. Film or sheet can be used alone or in combination with other sheet, fabric or structural units through lamination, coextrusion or coating. Fuel tank wall thicknesses range from about 2 mm up to 3 cm. For the invention the term "web" includes film, sheet, semi-rigid and rigid sheet or wall and formed rigid units. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc. In this application the term "barrier layer" includes a film, sheet, wall, coating, bladder or balloon.

Thermoplastic materials can be formed into barrier layer film using a variety of processes including blown thermoplastic extrusion, solvent casting, thermoforming, blow molding, injection molding, linear biaxially oriented film extrusion and by casting from molten thermoplastic resin, monomer or polymer (aqueous or organic solvent) dispersion. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion polyolefins (low density polyethylene (LDPE), linear low density polyethylene (LLDPE), high density polyethylene (HDPE) are the most frequently used thermoplastic polymers, although polypropylene, nylon, nitrites, poly (ethylene-co-terephthalate) PETG and polycarbonate are sometimes used to make blown film. Polyolefins typically have a melt index from 0.2 to 3 grams/10 mins., a density of about 0.910 to about 0.940 grams/cc, and a molecular weight ($M_w$) that can range from about 200,000 to 500,000. For biaxially oriented film extrusion the polymer most often used are olefin based—chiefly polyethylene and polypropylene (melt index from about 0.1 to 4, preferably 0.4 to 4 grams/10 mins. and a weight average molecular weight ($M_w$) of about 200,000 to 600,000). Polyesters and nylons can also be used. For casting, molten thermoplastic resin or monomer dispersion are typically produced from polyethylene or polypropylene. Occasionally, nylon, polyester and PVC (poly vinyl chloride) are cast. For roll coating of aqueous based acrylic urethane and PVDC (poly vinyl chloride), etc. dispersions are polymerized to an optimum crystallinity and molecular weight before coating. A variety of thermoplastic materials are used in making film and sheet products. Such materials include poly(acrylonitrile-co-butadiene-co-styrene) polymers, acrylic polymers such as the polymethylmethacrylate, poly-n-butyl acrylate, poly (ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (TEFLON®), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly (ethylene-co-1,4-naphthalene dicarboxylate), poly (butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene chloride) copolymers, specialty films including polysulfone, polyphenylene sulfide, polyphenylene oxide, liquid crystal polyesters, polyether ketones, polyvinylbutyrl, etc.

Film and sheet materials are commonly manufactured using thermoplastic techniques including melt extrusion, calendaring, solution casting, and chemical regeneration processes. In many manufacturing steps an axial or a biaxial orientation step is used. The majority of film and sheet manufactured using melt extrusion techniques. In melt extrusion, the material is heated above its melting point in an extruder typically having an introduction heating section, a melt region and an extruder section. The melt is introduced to a slot die resulting in a thin flat profile that is rapidly quenched to solid state and oriented. Typically the hot polymer film after extrusion is rapidly chilled on a roll or drum or using an air stream. Ultimately, a quenching bath can be used. Thermoplastic materials can also be blown. The hot melt polymer is extruded in an annular die in a tubular form. The initial form is inflated with air to a diameter determined by the desired film properties and by practical handling considerations. As the hot melt polymer emerges from the annular die, the extruded hot tube is expanded by air to 1.2 or four (4) times the initial die diameter. At the same time the cooling air chills the web forming an extrudate with a hollow circular cross section. The film tube is collapsed within a V-shaped frame and is nipped at the end of the frame to trap air within the thus formed bubble. Rolls draw the film from the die maintaining a continuous production of the extruded tube.

We have found that in the preparation of biaxially oriented film and in the production of blown thermoplastic film that the melt temperature and the die temperature are important in obtaining the permeability or permeant transmission rates preferred for films of the invention, to reduce melt fracture and to improve film uniformity (reduce surface defects). The temperature of the melt at the melt region should range from about 390–420° F., preferably 395–415° F. The temperature of the extrusion die should range from about 400–435° F., preferably 410–430° F. The extruded polymer can be cooled using ambient water baths or ambient air. The extruder can be operated at through put such that production rates can be maintained but the polymer can be sufficiently heated to achieve the melt and die temperatures required. Production of the films of the invention at these temperatures ensures that the cyclodextrin material is fully compatible in the thermoplastic melt, is not degraded by the high temperatures and a clear compatible useful barrier film is produced.

Often two thermoplastic materials are joined in a coextrusion process to produce tailored film, sheet or wall container-type product adapted to a fuel tank. One or more polymer types in two or more layers of melt are coextruded in a coextrusion die to have a film with versatile properties dried from both layers. Layers of the different polymers or resins are combined by either blending the materials in melt before extrusion or by parallel extrusion of the different thermoplastics. The melt flows laminarly through the die and onto a quenched drum. The film is processed conventionally and may be oriented after cooling. Films can contain a variety of additives such as antioxidants, heat stabilizers, UV stabilizers, slip agents, fillers, and anti-block agents with no negative effect on barrier properties.

The barrier layer of the invention can also be made by casting an aqueous dispersion or organic solvent dispersion or solution of a film forming polymer and the cyclodextrin derivative. The aqueous or solvent based material can be formed by commonly available aqueous or solvent based processing of commercially available polymers, polymer dispersions, polymer solutions or both polymer and common aqueous or solvent processing technology. The cyclodextrin derivative material can be combined with such aqueous or solvent based dispersions or solutions to form a film forming or readily formed coating material. Such barrier layers or barrier coatings can be formed using commonly available coating technology including roller coating, doctor blade coating, spin coating, etc. While the coatings can be made and removed from a preparative surface, commonly coatings are formed on a thermoplastic or thermosetting polymer web, and remain in place to act as a barrier layer on a polymeric web used in a packaging. The typical coatings can be made from the same thermoplastic polymer materials used in film sheet or other structural layers using substantially similar loadings of the cyclodextrin derivative material. The barrier layer or barrier coatings formed using the film forming polymer and the cyclodextrin derivative can be used as a single coating layer or can be used in a multiple coating structure having a barrier layer or coating on one or both sides of a structural film or sheet which can be used with other coating layers including printing layers, clear coating layers and other layers conventional in packaging, food packaging, consumer product packaging, etc.

The cyclodextrin materials can be incorporated into a barrier cellulosic web by coating the cellulosic web or a similar structure containing a cellulosic layer with a liquid coating composition containing an effective amount of a cyclodextrin or substituted cyclodextrin. Such coating compositions are typically formed using a liquid medium. Liquid mediums can include an aqueous medium or organic solvent media. Aqueous media are typically formed by combining water with additives and components that can form a useful coatable aqueous dispersion. Solvent based dispersions based on organic solvents can be made using known corresponding solvent base coating technology.

In forming the barrier layers of the invention, coatings can be formed either on a film which is later laminated on a film which is later laminated onto the cellulosic web or can be coated to form a film on the cellulosic web. Such coating processes involve the application of liquid to a traveling cellulosic web. Such coating processes commonly use machines having an application section and a metering section. Careful control of the amount and thickness of the coating obtains optimized barrier layers without waste of material. A number of coating machines are known such as tension sensitive coaters, for example, coaters using a metering rod, tension insensitive coating stations that can maintain coat weight even as web tensions vary, brush coating methods, air knife coaters, etc. Such coating machines can be used to coat one or both sides of a flexible film or one or both sides of a cellulosic web.

Coating machines described above commonly apply a liquid composition containing a film forming material, additives that can help form and maintain the coating composition along with the effective amount of the cyclodextrin or substituted cyclodextrin material. The film forming materials are often called a binder. Such binders exist in the final coating as a polymer of high molecular weight. Thermoplastic polymers or crosslinking polymers can both be used. Such binders are grouped into certain overlapping classes including acrylic, vinyl, alkyl, polyester, etc. Further, the compositions described above are materials that can be used in forming the polymer films also have corresponding materials that can be used in the formation of aqueous and solvent based coating compositions. Such coating compositions can be made by combining the liquid medium with solid materials containing the polymer, the cyclodextrin and a variety of useful additives. Commonly, the cyclodextrin materials added to the coating composition as part of the solids component. The solids present in the coating composition can contain from about 0.01 to about 10 wt % of the cyclodextrin compound, preferably about 0.1 wt % to 5 wt %, most preferably about 0.1 wt % to about 2 wt % of the cyclodextrin material based on the total solids in the solvent based dispersion composition.

Structural Webs Including a Barrier Layer

The fuel tank of the invention can be in the form of a single layer or single component structural member manufactured from a thermoplastic material having the cyclodextrin barrier material uniformly dispersed through the single component structure. Typical shapes and structural materials can be used in the manufacture of such a tank. Virtually all of the film materials set forth above can be formed into structural members in a non-flexible structural tank component.

Such tanks can be made by forming or casting a single unit or can be made by joining two or more sections into a finished unit. Such joinery can be accomplished using thermal or heat welding, adhesives (both thermoplastic and thermosetting), mechanical clamps or other joinery, etc. Further, the tanks can be formed having ports for sensor installation and for fuel inlet tubes. The barrier properties of such a tank can be enhanced using an exterior coating formed on the tank using the technology of the invention or by introducing a bladder or flexible bag-like container into the interior of the tank.

Cyclodextrin

The thermoplastic containers of the invention contain a cyclodextrin or a modified cyclodextrin material having pendent moieties or substituents that render the cyclodextrin material compatible with the thermoplastic polymer. For this invention, compatible means that the cyclodextrin material can be uniformly dispersed into the melt polymer, can retain the ability to trap or complex permeant materials or polymer impurity, and can reside in the polymer without substantial reductions in polymer characteristics. Compatibility can be determined by measuring polymer characteristics such as tensile strength, tear resistance, etc., permeability or transmission rates for permeants, surface smoothness, clarity, etc. Non-compatible derivatives will result in substantial reduced polymer properties, very high permeability or transmission rates and rough dull film. Qualitative compatibility screening can be obtained by preparing small batches (100 grams-one kilogram of thermoplastic and substituted cyclodextrin). The blended material is extruded at production temperatures as a linear strand extrudate having a diameter of about one to five mm. Incompatible cyclodextrin materials will not disperse uniformly in the melt and can be seen in the transparent melt polymer immediately upon extrusion from the extrusion head. We have found the incompatible cyclodextrin can degrade at extrusion temperatures and produce a characteristic "burnt flour" odor in an extrusion. Further, we have found that incompatible cyclodextrin can cause substantial melt fracture in the extrudate which can be detected by visual inspection. Lastly, the extrudate can be cut into small pieces, cross-sectioned and examined using an optical microscope to find incompatible cyclodextrin clearly visible in the thermoplastic matrix.

Cyclodextrin is a cyclic oligosaccharide consisting of at least six glucopyranose units joined by $\alpha(1\rightarrow 4)$ linkages. Although cyclodextrin with up to twelve glucose residues are known, the three most common homologs ($\alpha$ cyclodextrin, $\beta$ cyclodextrin and $\gamma$ cyclodextrin) having 6, 7 and 8 residues have been used.

Figure 1A:
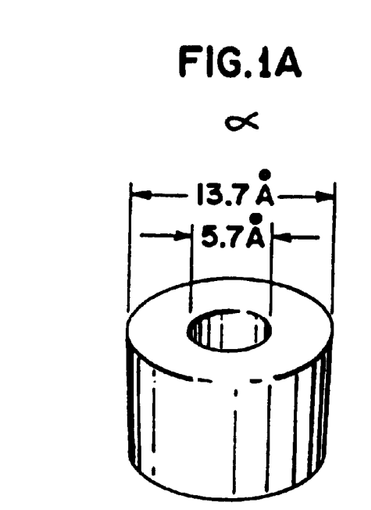
Figure 1B:
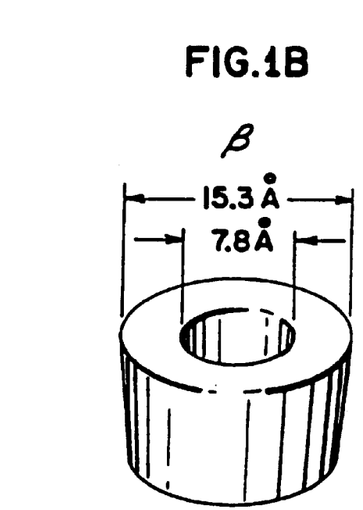
Figure 1C:
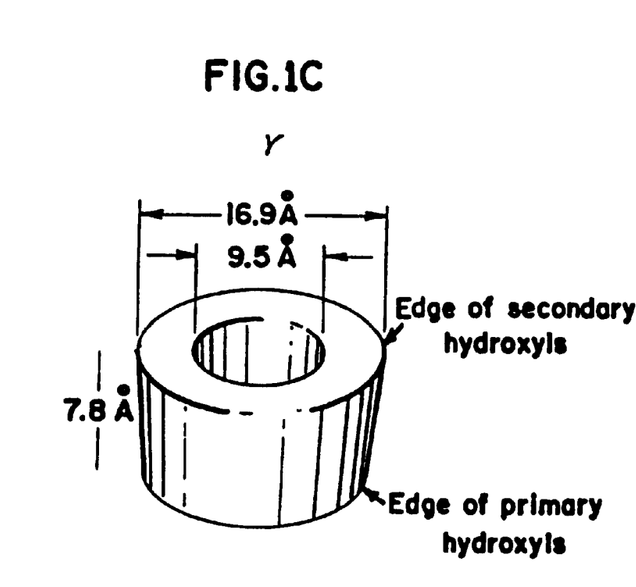

Cyclodextrin is produced by a highly selective enzymatic synthesis. They consist of six, seven, or eight glucose monomers arranged in a donut shaped ring, which are denoted $\alpha$, $\beta$, or $\gamma$ cyclodextrin respectively (See FIG. 1). The specific coupling of the glucose monomers gives the cyclodextrin a rigid, truncated conical molecular structure with a hollow interior of a specific volume. This internal cavity, which is lipophilic (i.e.,) is attractive to hydrocarbon materials (in aqueous systems is hydrophobic) when compared to the exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

CYCLODEXTRIN TYPICAL PROPERTIES

| PROPERTIES | CD | | |
|---|---|---|---|
| | α-CD | β-CD | γ-CD |
| | Degree of Polymerization (n = ) | | |
| | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]_D^{25}$ | +150.5 | +162.5 | +177.4 |
| color of iodine complex | Blue | Yellow | Yellowish Brown |
| Solubility in water (g/100 ml) 25° C. | | | |
| Distilled Water | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

$R_1$ = Primary Hydroxyls
$R_2$ = Secondary Hydroxyls wherein $R_1$ and $R_2$ are primary or secondary hydroxyl as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient thermoplastic compatible substituent groups on the molecule to insure that the cyclodextrin material can be uniformly dispersed into the thermoplastic and when formed into a clear film, sheet or rigid structure and does not detract from the polymer physical properties.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule.

Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the thermoplastic polymer involves one or more reaction(s) at the primary or secondary hydroxyls of the cyclodextrin molecule. Broadly we have found that a broad range of pendent substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphate cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl), mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (-SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxeme isomers, formyl methyl and its oxeme isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc. We are aware that certain βCD and acetylated and hydroxy alkyl derivatives are available from American Maize-Products Co., Corn Processing Division, Hammond, Ind.

The above explanation of the nature of the cyclodextrin derivatives, thermoplastic films, bulk materials manufacturing detail regarding the production of film, and the processes of cyclodextrin to make compatible derivatives provides a basis for understanding technology involving incorporating compatible cyclodextrin in thermoplastic structures for fuel vapor barrier purposes. The following examples, film preparation and permeation data provide a further basis for understanding the invention and includes the best mode.

After our work in producing cyclodextrin and compounding the cyclodextrins in thermoplastic films, we have found that the cyclodextrins can be readily derivatized using a variety of known chemical protocols. The cyclodextrin material can be melt blended into thermoplastic materials smoothly resulting in clear extrudable thermoplastic materials with the cyclodextrin materials uniformly distributed throughout the thermoplastic. Further, we have found that the cyclodextrin derivatives can be combined with a broad variety of thermoplastic films and structures. The cyclodextrin materials can be incorporated into the films in a broad range of cyclodextrin concentrations. The cyclodextrin containing thermoplastic materials can be blown into films or formed into structures of varying thickness and can be made free of melt fracture or other film or sheet variation. We have found in our experimentation that the barrier properties, i.e. reduction in transmission rate of aromatic hydrocarbons, aliphatic hydrocarbons, ethanol and water vapor can be achieved using the cyclodextrin derivative technology. In initial work we have also found (1) several modified cyclodextrin candidates were found to be compatible with the LLDPE resin and provide good complexation of residual LLDPE volatile contaminants as well as reduce organic permeants diffusing through the film. (2) Selected modified βCD (acetylated and trimethylsilyl ether derivatives) have no affect on transparency and thermal stability. The machinability of the extruded plastic material is effected somewhat causing some surface defects, thereby reducing the barrier properties of the film. (3) Films containing a modified βCD composition (1% by weight) reduce aromatic permeants by 35% at 72° F. and 38% at 105° F.; aliphatic permeants were reduced by only 9% at 72° F. These results would improve significantly if worst case shelf-life testing conditions were not used to test the films. (4) Complexation rates were different for aromatic and aliphatic permeants. Films containing modified βCD had better complexation rates for aromatics (gasoline-type compounds) than aliphatic (printing ink-type compounds). Conversely, film coating had significantly better complexation of aliphatic compound than aromatic compounds. (5) βCD containing acrylic coatings were the star performers reducing aliphatic permeants from 46% to 88%, while aromatics were reduced by 29%.

QUALITATIVE PREPARATION

Initially, we produced four experimental test films as a model for barrier layers. Three of the films contained β-cyclodextrin βCD at loading of 1%, 3% and 5% (wt./wt.) while the fourth was a control film made from the same batch of resin and additives but without βCD. The 5% loaded βCD film was tested for complexation of residual organic in the test film. The βCD was found to effectively complex residual organics in the linear low density polyethylene (LLDPE).

We have evaluated nine modified βcyclodextrins and a milled β-cyclodextrin (particle size 5 to 20 microns). The different cyclodextrin modifications were acetylated, an octanyl succinate derivative, an ethoxyhexyl glycidyl ether derivative, a quaternary amine derivative, a tertiary amine derivative, a carboxymethyl derivative, a succinylated, an amphoteric and trimethylsilyl ether derivative. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 50× and 200× magnification. The microscopic examination was used to visually check for compatibility between LLDPE resin and cyclodextrin. Of the ten cyclodextrin candidates tested, three (acetylated, octanyl succinate and trimethylsilyl ether) were found visually to be compatible with the LLDPE resin.

Complexed residual film volatiles were measured using cryotrapping procedure to test 5% βCD film sample and three extruded profiles containing 1% (wt/wt) acetylated βCD octanyl succinate βCD and trimethylsilyl ether. The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-$d_6$) immediately prior to the analysis. Benzene-$d_6$ serves as an internal QC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-$d_8$) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography/mass spectrometry (HRGC/MS). The results of the residual volatile analyses are presented in the table below:

TABLE 1

| Sample Identification | % Volatile Complexation as Compared to Control |
| --- | --- |
| 5% βCD Blown Film | 80 |
| 1% Acylated βCD Profile | 47 |
| 1% Octanyl Succinate βCD Profile | 0 |
| 1% Trimethylsilyl ether Profile | 48 |
| 1% βCD Milled Profile | 29 |

In these preliminary screening tests, βCD derivatives were shown to effectively complex trace volatile organics inherent in low density polyethylene resin used to make experimental film. In 5% βCD loaded LLDPE film, approximately 80% of the organic volatiles were complexed. However, all βCD films (1% and 5%) had an off-color (light brown) and off-odor. The color and odor problem is believed to be the result of direct decomposition of the CD or impurity in the CD. Two odor-active compounds (2-furaldehyde and 2-furanmethanol) were identified in the blown film samples.

Of the three modified compatible CD candidates (acetylated, octanyl succinate and trimethylsilyl ether), the acetylated and trimethylsilyl ether CD were shown to effectively complex trace volatile organics inherent in the LLDPE resin. One percent loadings of acetylated and trimethylsilyl ether (TMSE) βCD showed approximately 50% of the residual LPDE organic volatiles were complexed, while the octanyl succinate CD did not complex residual LLDPE resin volatiles. Milled βCD was found to be less effective (28%) than the acetylated and TMSE modified βCD's.

A combination of permeants was used to measure the function and performance of the CD. A combination was used to be realistic, since gasoline (principally an aromatic hydrocarbon mixture) and printing ink solvents (principally an aliphatic hydrocarbon mixture) are not formed from a single compound but are a mixture of compounds.

The aromatic permeant contained ethanol (20 ppm), toluene (3 ppm), p-xylene (2 ppm), o-xylene (1 ppm), trimethylbenzene (0.5 ppm) and naphthalene (0.5 ppm). The aliphatic permeant, a commercial paint solvent blend containing approximately twenty (20) individual compounds, was 20 ppm.

The permeation test device is described in U.S. Pat. No. 5,603,974, issued Feb. 18, 1997 to Wood et al., which is expressly incorporated by reference herein.

Experimental film performance was measured in the closed-volume permeation device. High-resolution gas chromatograph (HRGC) operated with a flame ionization detector (FID) was used to measure the change in the cumulative penetrant concentration as a function of time. Sample-side compound concentrations are calculated from each compound's response factor. Concentrations are reported in parts per million (ppm) on a volume/volume basis. The cumulative penetrant concentration on the sample-side of the film is plotted as a function of time.

We produced four experimental test films. Three of the films contained βCD at loading of 1%, 3% and 5% (wt/wt) while the fourth was a control film made from the same batch of resin and additives but without βCD.

A second experimental technique was also undertaken to determine whether βCD sandwiched between two control films will complex organic vapors permeating the layer. The experiment was carried out by lightly dusting βCD between two control film sheets.

The testing showed the control film performed better than βCD loaded films. The permeation test results also demonstrated that at a point of concentration the higher the βCD loading the poorer the film performed as a barrier. The test results for sandwiching βCD between two control films showed βCD being twice as effective in reducing permeating vapors than the control samples without βCD. This experiment supported that CD does complex permeating organic vapors in the film if the film's barrier qualities are not changed during the manufacturing process making the film a less effective barrier.

The 1% TMSE βCD film was slightly better than the 1% acetylated βCD film (24% -vs- 26%) for removing aromatic permeants at 72° F. adding more modified CD appeared to have no improvement.

For aromatic permeants at 105° F., both 1% TMSE βCD and 1% acetylated βCD are approximately 13% more effective removing aromatic permeants than 72° F. The 1% TMSE film was again slightly better than the 1% film (36% -vs- 31%) for removing aromatic permeants.

The 1% TMSE film was more effective initially removing aliphatic permeants than the 1% acetylated βCD film at 72° F. But for the duration of the test, 1% TMSE βCD was worse than the control while 1% acetylated βCD removed only 6% of the aliphatic permeants.

We produced two experimental aqueous coating solutions. One solution contained hydroxyethyl βCD (35% by weight) and the other solution contained hydroxypropyl βCD (35 by weight). Both solutions contained 10% of an acrylic emulsion comprising a dispersion of polyacrylic acid having a molecular weight of about 150,000 (Polysciences, Inc.) (15% solids by weight) as a film forming adhesive. These solutions were used to hand-coat test film samples by laminating two LLDPE films together. Two different coating techniques were used. The first technique very slightly stretched two film samples flat, the coating was then applied using a hand roller, and then the films were laminated together while stretched flat. The Rev. 1 samples were not stretched during the lamination process. All coated samples were finally placed in a vacuum laminating press to remove air bubbles between the film sheets. Film coating thicknesses were approximately 0.0005 inches. These CD coated films and hydroxylmethyl cellulose coated control films were subsequently tested.

A reduction in aromatic and aliphatic vapors by the hydroxyethyl βCD coating is greater in the first several hours of exposure to the vapor and then diminishes over the next 20 hours of testing. Higher removal of aliphatic vapors than aromatic vapors was achieved by the hydroxyethyl βCD coating; this is believed to be a function of the difference in their molecular size (i.e., aliphatic compounds are smaller than aromatic compounds). Aliphatic permeants were reduced by 46% as compared to the control over the 20 hour test period. Reduction of aromatic vapors was 29% as compared to the control over the 17 hour test period.

The Rev. 1 coated hydroxyethyl βCD reduced the aliphatic permeants by 87% as compared to the control over the 20 hour test period. It is not known if the method of coating the film was responsible for the additional 41% reduction over the other hydroxyethyl βCD coated film.

The hydroxyethyl βCD coating was slightly better for removing aromatic permeants than the hydroxypropyl βCD coating (29% -vs- 20%) at 72° F.

LARGE SCALE FILM EXPERIMENTAL SECTION

Preparation of Cyclodextrin Derivatives

EXAMPLE I

Acetyl Ester of β-cyclodextrin

An acetylated β-cyclodextrin was obtained that contained 3.4 acetyl groups per cyclodextrin on the primary hydroxyl (—OH) group.

EXAMPLE II

Trimethyl Silyl Ether of β-cyclodextrin

Into a rotary evaporator equipped with a 4000 milliliter round bottom flask and a nitrogen atmosphere, introduced at a rate of 100 milliliters $N_2$ per minute, was placed three liters of dimethylformamide. Into the dimethylformamide was placed 750 grams of β-cyclodextrin. The β-cyclodextrin was rotated and dissolved in dimethylformamide at 60° C. After dissolution, the flask was removed from the rotary evaporator and the contents were cooled to approximately 18° C. Into the flask, placed on a magnetic stirrer and equipped with a stir bar, was added 295 milliliters of hexamethyldisilylazine (HMDS-Pierce Chemical No. 84769), followed by the careful addition of 97 milliliters of trimethylchlorosilane (TMCS-Pierce Chemical No. 88531). The careful addition was achieved by a careful dropwise addition of an initial charge of 20 milliliters and after reaction subsides the careful dropwise addition of a subsequent 20 milliliter portions, etc. until addition is complete. After the addition of the TMCS was complete, and after reaction subsides, the flask and its contents were placed on the rotary evaporator, heated to 60° C. while maintaining an inert nitrogen atmosphere flow of 100 milliliters of $N_2$ per minute through the rotary evaporator. The reaction was continued for four hours followed by removal of solvent, leaving 308 grams of dry material. The material was removed from the flask by filtering, washing the filtrate with deionized water to remove the silylation products, vacuum oven drying (75° C. at 0.3 inches of Hg) and stored as a powdered material and maintained for subsequent compounding with a thermoplastic material. Subsequent spectrographic inspection of the material showed the β-cyclodextrin to contain approximately 1.7 trimethylsilylether substituent per β-cyclodextrin molecule. The substitution appeared to be commonly on a primary 6-carbon atom.

EXAMPLE III

An hydroxypropyl β-cyclodextrin was obtained with 1.5 hydroxypropyl groups per molecule on the primary 6—OH group of the βCD.

EXAMPLE IV

An hydroxyethyl β-cyclodextrin was obtained with 1.5 hydroxyethyl groups per molecule on the primary 6—OH group of the βCD.

Preparation of Films

To test for barrier properties of a barrier layer, we prepared a series of films using a linear low density polyethylene resin, βCD and derivatized βCD such as the acetylated or the trimethylsilyl derivative of a β-cyclodextrin. The polymer particles were dry blended with the powdered β-cyclodextrin and β-cyclodextrin derivative material, a fluoropolymer lubricant (3M) and the antioxidant until uniform in the dry blend. The dry blend material was mixed and extruded in a pellet form in a Haake System 90, ¾" conical extruder. The resulting pellets were collected for film preparation.

Table 1A displays typical pelletizing extruder conditions. The films were blown in an extruder as described in U.S. Pat. No. 5,603,974, issued Feb. 18, 1997 to Wood et al., which is expressly incorporated by reference herein. The film is manufactured according to the above protocol and reported in Table IB. The film was tested for transmission rates at a variety of environmental conditions. Environmental test conditions are shown below in Table II. In the following tables, RH stands for relative humidity, $A_w$ stands for water activity and HP stands for hydroxypropyl.

TABLE IA 0.5% TMSE pelletizing 1-19-94

| Run Time | 0 min 13 sec | Torque Tot. Torque | 4866 meter-gram 0.0 mkg-min | Rotor Aux. | 198 rpm 0% | |
|---|---|---|---|---|---|---|
| Channels | 1 | 2 | 3 | 4 | 5 | 6 |
| Melt Temp | 37 | 41 | 41 | 41 | 41 | °C. |

TABLE IA-continued 0.5% TMSE pelletizing 1-19-94

| Run Time | 0 min 13 sec | Torque Tot. Torque | 4866 meter-gram 0.0 mkg-min | Rotor Aux. | 198 rpm 0% | |
|---|---|---|---|---|---|---|
| Set Temp | 150 | 160 | 160 | 170 | 0 | 0 | °C. |
| Deviation | 0 | 0 | 0 | 0 | 0 | 0 | °C. |
| Cooling | Yes | Yes | Yes | Yes | | | |
| Pressure | 0 | 0 | 2739 | 0 | 0 | | psi |

TABLE IB

Extruded Films (Exxon LL3201)
Made With Low Density Polyethylene

| Roll No. | Sample ID | Fluoropolymer Additive[1] | Extruder Temp. Zone 3 (F.) | Melt Temp (F.) | Die Temp. Zone 3 (F.) | Lbs./Hr | RPM | Die Gap | Comments |
|---|---|---|---|---|---|---|---|---|---|
| 1 | Control | 500 ppm | 428 | 406 | 406 | 30.1 | 50 | 24 | |
| 2 | 1% Ex. I | 1000 ppm | 441 | 415 | 420 | 29.7 | 50 | 35 | |
| 3 | 1% Ex. I | 1000 ppm | 441 | 416 | 420 | 28.5 | 50 | 35 | |
| 4 | 1% Ex. I | 500 ppm | 441 | 415 | 420 | 29.9 | 50 | 35 | |
| 5 | 1% Ex. I | 500 ppm | 418 | 405 | 414 | 29.9 | 50 | 35 | |
| 6 | 1% Ex. I | 500 ppm | 421 | 397 | 414 | 29.0 | 50 | 35 | |
| 7 | 0.5% Ex. I | 500 ppm | 421 | 403 | 415 | 29.0 | 50 | 35 | |
| 8 | 2% Ex. I | 500 ppm | 421 | 404 | 415 | 27.7 | 50 | 35 | Very slight melt fracture. |
| 9 | 1% Ex. II | 500 ppm | 421 | 406 | 415 | 28.3 | 50 | 35 | Particles in film. |
| 10 | 1% Ex. II | 500 ppm | 426 | 410 | 415 | 26.7 | 50 | 35 | Particles in film. |
| 11 | 1% Ex. II | 500 ppm | 432 | 415 | 414 | 29.0 | 50 | 35 | Particles in film. Very slight yellowing to film. |
| 12 | 1% Ex. II | 500 ppm | 431 | 414 | 415 | 21.5 | 39 | 35 | Particles in film. |
| 13 | 0.5% Ex. II | 500 ppm | 431 | 415 | 415 | 27.7 | 50 | 35 | Particles in film. |
| 14 | 0.5% Ex. II | 500 ppm | 425 | 410 | 415 | 28.9 | 50 | 35 | Particles in film. |
| 15 | 2% Ex. II | 500 ppm | 410 | 414 | 415 | 20.2 | 38 | 35 | Particles in film. Very slight yellowing to film. |
| 16 | 2% Ex. II | 500 ppm | 422 | 415 | 415 | 20.5 | 38 | 35 | Particles in film Very slight yellowing to film. |
| 17 | 2% Ex. II | 500 ppm | 422 | 416 | 415 | 20.5 | 38 | 35 | Particles in film Very slight yellowing of film. |

[1]Also contains 500 ppm Irganox 1010 antioxidant and 1000 ppm Irganos 168.

The results of the testing show that the inclusion of a compatible cyclodextrin material in the thermoplastic films of the invention substantially improves the barrier properties by reducing transmission rate of a variety of fuel vapor permeants. The data showing the improvement in transmission rate is shown below in the following data tables.

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| Control Film | 3.35E-04 | 0% | 3.7E-04 | 0% |
| 1.0% CS-001 (Roll #2) | 3.18E-04 | 5% | 3.6E-04 | 5% |
| 1.0% CS-001 (Roll #3) | 2.01E-04 | 40% | 2.5E-04 | 33% |
| 1.0% | 2.67E-04 | 20% | 3.3E-04 | 13% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| CS-001 (Roll #5) | | | | |
| 1.0% CS-001 (Roll #6) | 3.51E-04 | −5% | 3.8E-04 | −1% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E-03 | 0% |
| 0.5% CS-001 (Roll #7) | 7.67E-03 | 2% |
| 1% CS-001 (Roll #5) | 7.37E-03 | 6% |
| 2% CS-001 (Roll #8) | 6.53E-03 | 16% |

$$* \frac{gm \cdot 0.001\,in.}{100\,in^2 \cdot 24\,hrs.}$$

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| Control Film (Roll #1) | 5.16E-04 | 0% | 5.63E-04 | 0% |
| 1.0% CS-001 (Roll #5) | 4.01E-04 | 22% | 5.17E-04 | 8% |
| 2.0% CS-001 (Roll #8) | 2.91E-04 | 44% | 3.08E-04 | 45% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E-03 | 0% |
| 0.5% CS-001 (Roll #7) | 7.67E-03 | 2% |
| 1% CS-001 (Roll #5) | 7.37E-03 | 6% |
| 2% CS-001 (Roll #8) | 6.53E-03 | 16% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|

$$* \frac{gm \cdot 0.001\,in.}{100\,in^2 \cdot 24\,hrs.}$$

Comparison of Transmission Rates in
Modified β-Cyclodextrin - LLDPE Films
Temperature 72° F.
Sample Side: 0.25 Aw
Environment 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 3.76E-04 | 0% | 3.75E-04 | 0% |
| 0.5% CS-001 (Roll #7) | 2.42E-04 | 36% | 2.41E-04 | 36% |
| 1% CS-001 (Roll #5) | 3.39E-04 | 10% | 3.38E-04 | 10% |
| 2% CS-001 (Roll #8) | 2.48E-04 | 34% | 2.47E-04 | 34% |

Comparison of Transmission Rates in
Modified β-Cyclodextrin - LPDE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 1.03E-03 | 0% | 1.13E-03 | 0% |
| 1% CS-001 (Roll #2) | 5.49E-04 | 47% | 5.79E-04 | 49% |
| 1% CS-001 (Roll #3) | 4.74E-04 | 54% | 5.00E-04 | 56% |
| 1% CS-001 (Roll #4) | 6.41E-04 | 38% | 6.83E-04 | 40% |
| 1% CS-001 (Roll #5) | 5.22E-04 | 49% | 5.54E-04 | 51% |
| 1% CS-001 (Roll #6) | 4.13E-04 | 60% | 4.39E-04 | 61% |
| 2% CS-001 (Roll #8) | 5.95E-04 | 42% | 6.18E-04 | 45% |
| 1% TMSE (Roll #12) | 8.32E-04 | 19% | 8.93E-04 | 21% |

$$* \frac{gm \cdot 0.001\,in.}{100\,in^2 \cdot 24\,hrs.}$$

Comparison of Transmission Rates in
Modified β-Cyclodextrin - LPDE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 4.34E-04 | 0% | 4.67E-04 | 0% |
| 0.5% CS-001 (Roll #7) | 4.03E-04 | 7% | 4.41E-04 | 6% |
| 1.0% CS-001 (Roll #5) | 5.00E-04 | -15% | 5.33E-04 | -14% |
| 2.0% CS-001 (Roll #8) | 3.96E-04 | 9% | 3.94E-04 | 16% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film | 3.09E-04 | 0% | 3.45E-04 | 0 |
| 0.5% TMSE (Roll #13) | 2.50E-04 | 19% | 2.96E-04 | 14% |
| 0.5% TMSE (Roll #14) | 2.37E-04 | 23% | 2.67E-04 | 33% |
| 1% TMSE (Roll #9) | 2.67E-04 | 14% | 3.05E-04 | 12% |
| 1% TMSE (Roll #10) | 4.85E-04 | -57% | 5.27E-04 | -53% |
| 1% TMSE (Roll #11) | 2.58E-04 | 17% | 2.92E-04 | 15% |
| 1% TMSE (Roll #12) | 2.15E-04 | 31% | 2.55E-04 | 26% |
| 2% TMSE (Roll #15) | 2.54E-04 | 18% | 3.04E-04 | 12% |
| 2% TMSE (Roll #16) | 2.79E-04 | 10% | 3.21E-04 | 7% |
| 2% TMSE (Roll #17) | 2.81E-04 | 9% | 3.24E-04 | 6% |

$$* \frac{gm \cdot 0.001\,in.}{100\,in^2 \cdot 24\,hrs.}$$

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naptha % Improvement Over Control |
|---|---|---|
| Control Film (Roll #1) | 9.43E-03 | 0% |
| 1% TMSE (Roll #12) | 1.16E-02 | -23% |
| 2% TMSE (Roll #15) | 1.56E-02 | -65% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 8.36E-14 | 0% | 9.05E-04 | 0% |
| 0.5% TMSE (Roll #14) | 6.77E-14 | 19% | 7.25E-04 | 20% |
| 2% TMSE (Roll #15) | 6.36E-14 | 24% | 6.81E-04 | 25% |

$$* \frac{gm \cdot 0.001\,in.}{100\,in^2 \cdot 24\,hrs.}$$

Comparison of Transmission Rates in
Modified β-Cyclodextrin - LPDE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| PVDC Control | 6.81E-05 | 0% | 1.05E-04 | 0% |
| PVDC w/ 10% HP BCD | 1.45E-05 | 79% | 2.39E-05 | 77% |
| PVDC w/ 20% HP BCD | 9.71E-05 | -42% | 1.12E-04 | -7% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Acrylic | 2.07E-06 | 0% | 2.10E-05 | 0% |
| 5% HP B-CyD/ Acrylic | 1.50E-06 | 27% | 2.07E-05 | 0% |
| 10% HP B-CyD/ Acrylic | 4.13E-06 | -100% | 4.30E-05 | -105% |

$$* \frac{gm \cdot 0.001\,in.}{100\,in^2 \cdot 24\,hrs.}$$

We prepared a series of aqueous coatings containing hydroxypropyl βCD. One of the coatings was prepared from a 10% acrylic emulsion (a polyacrylic acid polymer having a molecular weight of about 150,000 purchased from Polysciences, Inc.). The 10% acrylic emulsion contained hydroxypropyl βCD at a 5% and 10% by weight loading. These solutions were used to hand-coat test film samples by laminating two films. The coatings were applied to linear low density polyethylene film sheet containing 0.5% acetylated βCD (Roll No. 7) and to a second film sheet containing 2% acetylated βCD (Roll No. 8) using a hand roller and then laminating the films. The films were not stretched during lamination. All coated samples were placed in a vacuum laminating press to remove air bubbles between the film sheets. The acrylic coating thickness was about 0.0002 inch. An acrylic coated control was prepared in an identical manner containing no hydroxypropyl βCD. The multilayer structure was tested with the 0.5% acetylated βCD film facing the environmental flask side of the test cell as previously referenced.

A second coating was prepared from a vinylidene chloride latex (PVDC, 60 wt-% solids) purchased from Dagax Laboratories, Inc. The PVDC latex coating was prepared with two levels of hydroxypropyl βCD—10% and 20% by weight of the derivatized cyclodextrin. These solutions were used to hand-coat linear low density polyethylene test film samples by laminating the two films together. The coatings were applied to two control film sheets (rolled into one) using a hand roller and laminated together. The films were not stretched during lamination process. All coated samples were placed in a vacuum laminating press to remove air bubbles between the film sheets. The PVDC coating thickness was approximately 0.0004 inch. A PVDC coated control was prepared in an identical manner but without hydroxypropyl βCD. We believe the model films, coatings and laminate structures accurately predict the performance of the CD containing fuel container fuel vapor barrier structures.

The data following the preparatory examples showing improvement in the transmission rate was obtained using the following general test method.

Method Summary

This method involves experimental techniques designed to measure the permeability of selected organic molecules through food packaging films, using a static concentration gradient. The test methodology simulates accelerated shelf-life testing conditions by implementing various storage humidities, product water activities and temperature conditions and using organic molecule concentrations found in previously tested food products to simulate outside-the-package organic vapors in the permeation test cell. This procedure allows for the determination of the following compounds: ethanol, toluene, p-xylene, o-xylene, 1,2,4-trimethyl benzene, naphthalene, naphtha solvent blend, etc.

| Test Compounds | Threshold Odor Conc. ul/L ppm | Environmental Cell Conc. ul/L ppm |
|---|---|---|
| Ethanol | 5–5000 | 20 |
| Toluene | 0.10–20 | 3 |
| p-Xylene | 0.5 | 2 |
| o-Xylene | 0.03–12 | 1 |
| 1, 2, 3-Trimethyl Benzene | NA | 0.5 |
| Naphthalene | 0.001–0.03 | 0.5 |
| Naphtha Solvent Blend | NA | 40 |

Table 1. Permeant Test Compounds

In a typical permeation experiment, three steps are involved. They are (a) the instrument sensitivity calibration, (b) film testing to measure transmission and diffusion rates, and (c) the quality control of the permeation experiment.

Film samples are tested in a closed-volume permeation device. High-resolution gas chromatograph (HRGC) operated with a flame ionization detector (FID) is used to measure the change in the cumulative penetrant concentration as a function of time.

Sample-side and environment-side test compound concentrations are calculated from each compound's response factor or calibration curve. Concentrations are then volume-corrected for each specific set of permeation cells if permeant mass is desired.

The cumulative penetrant concentration is plotted as a function of time on both the upstream (environment) and downstream (sample) side of the film. The diffusion rate and transmission rate of the permeant are calculated from the permeation curve data.

1.0 Equipment and Reagents
 2.1 Equipment
  Gas chromatograph (HP 5880) equipped with flame ionization detector, a six-port heated sampling valve with 1 ml sampling loop and data integrator
  J&W capillary column. DB-5, 30M×0.250 mm ID, 1.0 umdf.
  Glass permeation test cells as previously referenced.
  Permeation cell clamping rings (2).
  Permeation cell aluminum seal rings (2).
  Natural Rubber Septa. 8 mm OD standard-wall or 9 mm OD (Aldrich Chemical Company, Milwaukee, Wis.).
  Assorted laboratory glass ware and syringes.
  Assorted laboratory supplies.
 2.2 Reagents
  Reagent-water. Water in which interferences are not observed at the MDL of the chemical analytes of interest. A water purification system is used to generate reagent water which has been boiled to 80% volume, capped, and allowed to cool to room temperature before use.
  Stock Ethanol/Aromatic Standard solution. Ethanol (0.6030 gram), toluene (0.1722 gram), p-xylene (0.1327 gram), o-xylene (0.0666 gram), trimethylbenzene (0.0375 gram) and naphthalene (0.0400 gram) package in 1 ml sealed glass ampules. Naphtha blends standard is a commercial paint solvent blend containing approximately twenty (20) individual aliphatic hydrocarbon compounds obtained from Sunnyside Corporation, Consumer Products Division, Wheeling, Ill.
  Triton X-100. Nonylphenol nonionic surface active agent (Rohm and Hass).
2.0 Standards Preparation
 2.2 Permeation Working Standard
  A stock permeant test standard solution is used. These standards are prepared by weight from neat certified reference compounds, actual weight and weight percent are shown.
  The working ethanol/aromatic standard is prepared by injecting 250 ul of the stock standard solution into 100 ml of reagent water containing 0.1 gram of surfactant (Triton X-100). It is important that the Triton X-100 is completely dissolved in the reagent water prior to adding the permeant stock standard. This will insure dispersing the test compounds in the water. In addition, the working standard should be mixed thoroughly each time an aliquot is dispensed. It is advisable to transfer the working standard to crimp-top vials with no headspace to minimize losses due to the large headspace in the volumetric flask used to prepare the standard.
  A working naphtha blend standard is prepared by injecting 800 μL of the "neat" naphtha solvent blend into 100 milliliters of reagent water containing 0.2 gram of surfactant (Triton X-100).

An opened stock standard solution should be transferred from the glass snap-cap vial to a crimp-top vial for short-term storage. The vials may be stored in an explosion-proof refrigerator or freezer.

2.1 Calibration Standards

Calibration standards are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the environment and sample side cells.

3.0 Sample Preparation 3.1 Film Sample Preparation

The permeation test cell as previously referenced, also known as an environment flask, and sample flask are washed before use in soapy water, thoroughly rinsed with deionized water, and oven-dried. Following cleaning, each flask is fitted with a rubber septum.

The film test specimen is cut to the inside diameter of the aluminum seal ring using a template. The film test specimen diameter is important to prevent diffusion losses along the cut edge circumference. The film sample, aluminum seals, and flasks are assembled as shown in FIG. 2, but the clamping ring nuts are not tightened.

The test cell is prepared as described in U.S. Pat. No. 5,603,974, as previously referenced.

At the end of each time interval, a sample from the group is removed from the oven. The environmental flask is analyzed first, using a heated six-port sampling valve fitted with a 1 ml loop. The loop is flushed with a 1 ml volume of the environment-side or sample-side air. The loop is injected onto the capillary column. The GC/FID system is started manually following the injection. Up to eight 1 ml sample injections may be taken from the sample and environment side of a single permeation experiment.

Sample side and environment side test compound concentrations are calculated from each compound's calibration curve or response factor (equation 1 or 3). Concentrations are then volume-corrected for each specific set of permeation flasks if permeant mass is desired.

4.0 Sample Analysis 4.1 Instrument Parameters

Standards and samples are analyzed by gas chromatography using the following method parameters:

Column: J&W column, DB-5, 30 M, 0.25 mm ID, 1 umdf
Carrier: Hydrogen
Split Vent: 9.4 ml/min
Injection Port Temp: 105° C.
Flame Detector Temp: 200° C.
Oven Temp 1: 75° C.
Program Rate 1: 15° C.
Oven Temp 2: 125° C.
Rate 2: 20° C.
Final Oven Temp: 200° C.
Final Hold Time: 2 Min The six-port sampling valve temperature is set to 105° C.

4.2 Calibration

A three point calibration is prepared using standards in the range of the following test compounds:

| Test Compounds | Calibration Curve Range ppm ($\mu$L) |
|---|---|
| Ethanol | 2–20 |
| Toluene | 0.3–3 |
| p-Xylene | 0.2–2 |
| o-Xylene | 0.1–1 |
| 1, 2, 4-Trimethyl Benzene | 0.05–0.5 |
| Naphthalene | 0.05–0.5 |
| Naphtha Solvent Blend | 4.0–40 |

To prepare a calibration standard, add an appropriate volume of the working standard solution to an aliquot of reagent water in a volumetric flask.

4.2.1 Secondary Dilutions of Working Standard for Calibration Curve 5 to 1 dilution: Place 5 ml of working standard into a 25-ml volumetric flask, stopper, then mix by inverting flask.

2.5 to 1 dilution: Place 10 ml of working standard into a 25-ml volumetric flask, stopper, then mix by inverting flask.

Analyze each calibration standard and tabulate compound peak area response versus the concentration of the test compound in the environment side cell. The results are used to prepare a calibration curve for each compound. The naphtha solvent blend is a commercial paint solvent containing approximately twenty (20) individual aliphatic hydrocarbon compounds. The response versus concentration is determined by totaling the area under each of the twenty individual peaks. Method of least squares is used to fit a straight line to the calibration curve. The slope of each test compound's calibration curve is then calculated for determining the unknown concentration. The average response factor may be used in place of the calibration curve.

The working calibration curve or response factor must be verified on each working day by measurement of one or more calibration standards. If the response of any compound varies more than 20%, the test must be repeated using a fresh calibration standard. If the results still do not agree, generate a new calibration curve.

4.3 Analysis of Calibration Curve and Method Detection Level Samples

Recommended chromatographic conditions are summarized above.

Calibrate the system daily as described above.

Check and adjust split vent rate and check rate with soap film flow meter.

To generate accurate data, samples, calibration standards and method detection level samples must be analyzed under identical conditions.

Calibration standards and method detection samples are prepared in the environment flask only. This is accomplished by using a ½ inch plastic disk and aluminum sheet disk the diameter of the environment flange in place of the sample flask. A single sealing ring is placed onto the environmental glass flange followed by an aluminum sheet, and then the plastic disk.

The environment flask is flushed with dry compressed air to remove humidity in the sample and environment flask. This is done by puncturing the environment septa with a needle and tubing assembly which permits a controlled flow of dry air through the flask. The clamp rings are loosely fitted to the flask to eliminate pressure buildup. After flushing both flasks for approximately 10 minutes, the needle is removed and the clamp rings tightened, sealing the aluminum sheet against the seal ring.

Next, 40 $\mu$l of the permeation ethanol/aromatic working standard or secondary dilutions of the working standard is injected into the environment flask. Alternatively, 40 μL of the naphtha solvent blend or secondary dilutions of the working standard is injected into the environmental flask. The time is recorded and the flask is placed into a thermostatically controlled oven.

At the end of 30 minutes, the environment flask is removed from the oven. The environmental flask is analyzed using a heated six-port sampling valve fitted with a 1 ml loop. The loop is flushed with a 1 ml volume of the environment-side or sample-side air. The loop is injected onto the capillary column. The GC/FID system is started manually following the injection.

4.4 Calculation of Results 4.4.1 Test Compound Response Factor

Sample-side and environment-side test compound concentrations are calculated for each compound's calibration curve slope or response factor (RF). Concentrations are then volume-corrected for each specific set of permeation cells if permeant mass is desired.

$$\text{Concentration of Compound in ppm} = \frac{\text{Peak Area}}{\text{Calibration Curve Slope}} \quad (1)$$

$$\text{Compound Specific } RF = \frac{\text{Concentration of Compound in ppm}}{\text{Peak Area}} \quad (2)$$

$$\text{Concentration of Compound in ppm} = \text{Peak Area} \times RF \quad (3)$$

The cumulative penetrant mass is plotted as a function of time on both the upstream (environment) and downstream (sample) side of the film. The diffusion rate and transmission rate of the permeant area calculated from the transmission curve data.

4.4.2 Transmission Rate

When a permeant does not interact with the polymer, the permeability coefficient, R, is usually characteristic for the permeant-polymer system. This is the case with the permeation of many gases, such as hydrogen, nitrogen, oxygen, and carbon dioxide, through many polymers. If a permeant interacts with polymer molecules, as is the case with the permeant test compounds used in this method, P is no longer constant and may depend on the pressure, film thickness, and other conditions. In such cases, a single value of P does not represent the characteristic permeability of the polymer membrane and it is necessary to know the dependency of P on all possible variables in order to obtain the complete profile of the permeability of the polymer. In these cases, the transmission rate, Q, is often used for practical purposes, when the saturated vapor pressure of the permeant at a specified temperature is applied across the film. Permeability of films to water and organic compounds is often expressed this way.

$$P = \frac{(\text{Amount of Permeant})(\text{Film Thickness})}{(\text{Area})(\text{Time})(\text{Pressure-drop Across the Film})} \quad (4)$$

$$Q = \frac{(\text{Amount of Permeant})(\text{Film Thickness})}{(\text{Area})(\text{Time})} \quad (5)$$

In this application, Q is represented in units of $$\frac{\text{gm-0.001 inches}}{100 \text{ in}^2\text{-day.}}$$

One of the major variables in determining the permeation coefficient is the pressure drop across the film. Since the transmission rate Q includes neither pressure nor concentration of the permeant in its dimensions, it is necessary to know either vapor pressure or the concentration of permeant under the conditions of the measurement in order to correlate Q to P.

The pressure-drop across the film from environment side to sample side is principally due to water vapor pressure. The water concentration or humidity does not remain constant and is not measured during the time intervals the organic compounds are analyzed, and therefore the pressure across the membrane is not determined.

The above examples of thermoplastic films containing a variety of compatible cyclodextrin derivatives shows that the invention can be embodied in a variety of different thermoplastic films. Further, a variety of different compatible derivatized cyclodextrin materials can be used in the invention. Lastly, the films can be manufactured using a variety of film manufacturing techniques including extrusion and aqueous dispersion coating to produce useful barriers by any fuel permeant or other component.

The above specification, examples of substituted cyclodextrin, extruded thermoplastic materials containing the cyclodextrin and test data showing structures with improved barriers to fuel vapors provide a basis for understanding the technical aspects of the invention. However, since the invention can be made with a variety of embodiments, the invention resides in the claims hereinafter appended.

We claim:

1. A thermoplastic fuel tank for use in a motor vehicle, having improved fuel vapor barrier properties, the tank comprising
   a shell having at least two layers: (a) a first layer comprising a structural thermoplastic material; and
   (b) a second layer comprising a thermoplastic film comprising a continuous thermoplastic web having dispersed in the web, an effective fuel vapor barrier amount of a modified cyclodextrin having pendent moieties or substituents that render the cyclodextrin compatible with the thermoplastic polymer;
   wherein the cyclodextrin is free of an inclusion complex compound and cooperates with the thermoplastic web to provide barrier properties.

2. The tank of claim 1 wherein the second layer is joined to the first layer using an adhesive.

3. The tank of claim 1 wherein the thermoplastic comprises a vinyl polymer.

4. The tank of claim 2 wherein the vinyl polymer comprises a polymer comprising an α-olefin.

5. The tank of claim 3 wherein the α-olefin comprises ethylene, propylene or mixtures thereof.

6. The tank of claim 1 wherein the cyclodextrin comprises an α-cyclodextrin, a β-cyclodextrin, a γ-cyclodextrin or mixtures thereof.

7. The tank of claim 5 wherein the modified cyclodextrin comprises a cyclodextrin having at least one substituent on a cyclodextrin primary carbon atom.

8. The tank of claim 1 wherein the thermoplastic shell contains about 0.1 to 5 wt % of the modified cyclodextrin.

9. The tank of claim 1 wherein the thermoplastic comprises polyethylene with a melt index of about 0.1 to 4 and a weight average molecular weight greater than about 200,000.

10. The tank of claim 1 wherein the thermoplastic comprises a linear polyethylene.

11. The tank of claim 10 wherein the linear polyethylene comprises a linear low density polyethylene.

12. The tank of claim 1 wherein the thermoplastic comprises a high density polyethylene.

13. The tank of claim 1 wherein the modified cyclodextrin comprises an acetylated cyclodextrin.

14. The tank of claim 1 wherein the modified cyclodextrin comprises a trimethyl silylated cyclodextrin.

15. A thermoplastic fuel tank for use in a motor vehicle, having improved fuel vapor barrier properties, the tank comprising
   a shell having at least two layers: (a) a first layer comprising a structural thermoplastic material; and
   (b) a second layer comprising a thermoplastic coating layer comprising a continuous thermoplastic web having dispersed in the web, an effective fuel vapor barrier amount of a modified cyclodextrin having pendent moieties or substituents that render the cyclodextrin compatible with the thermoplastic polymer;
wherein the cyclodextrin is free of an inclusion complex compound and cooperates with the thermoplastic web to provide barrier properties.

16. The tank of claim 15 wherein the thermoplastic comprises a vinyl polymer.

17. The tank of claim 16 wherein the vinyl polymer comprises a polymer comprising an $\alpha$-olefin.

18. The tank of claim 17 wherein the $\alpha$-olefin comprises ethylene, propylene or mixtures thereof.

19. The tank of claim 15 wherein the cyclodextrin comprises an $\alpha$-cyclodextrin, a $\beta$-cyclodextrin, a $\gamma$-cyclodextrin or mixtures thereof.

20. The tank of claim 15 wherein the modified cyclodextrin comprises a cyclodextrin having at least one substituent on a cyclodextrin primary carbon atom.

21. The tank of claim 15 wherein the thermoplastic shell contains about 0.1 to 5 wt % of the modified cyclodextrin.

22. The tank of claim 15 wherein the thermoplastic comprises polyethylene with a melt index of about 0.1 to 4 and a weight average molecular weight greater than about 200,000.

23. The tank of claim 15 wherein the thermoplastic comprises a linear polyethylene.

24. The tank of claim 23 wherein the linear polyethylene comprises a linear low density polyethylene.

25. The tank of claim 15 wherein the thermoplastic comprises a high density polyethylene.

26. The tank of claim 15 wherein the modified cyclodextrin comprises an acetylated cyclodextrin.

27. The tank of claim 15 wherein the modified cyclodextrin comprises a trimethyl silylated cyclodextrin.

* * * * *